2,925,396
RECLAIMING OF UNCURED AND COMPOUNDED LATEX FOAM STOCK

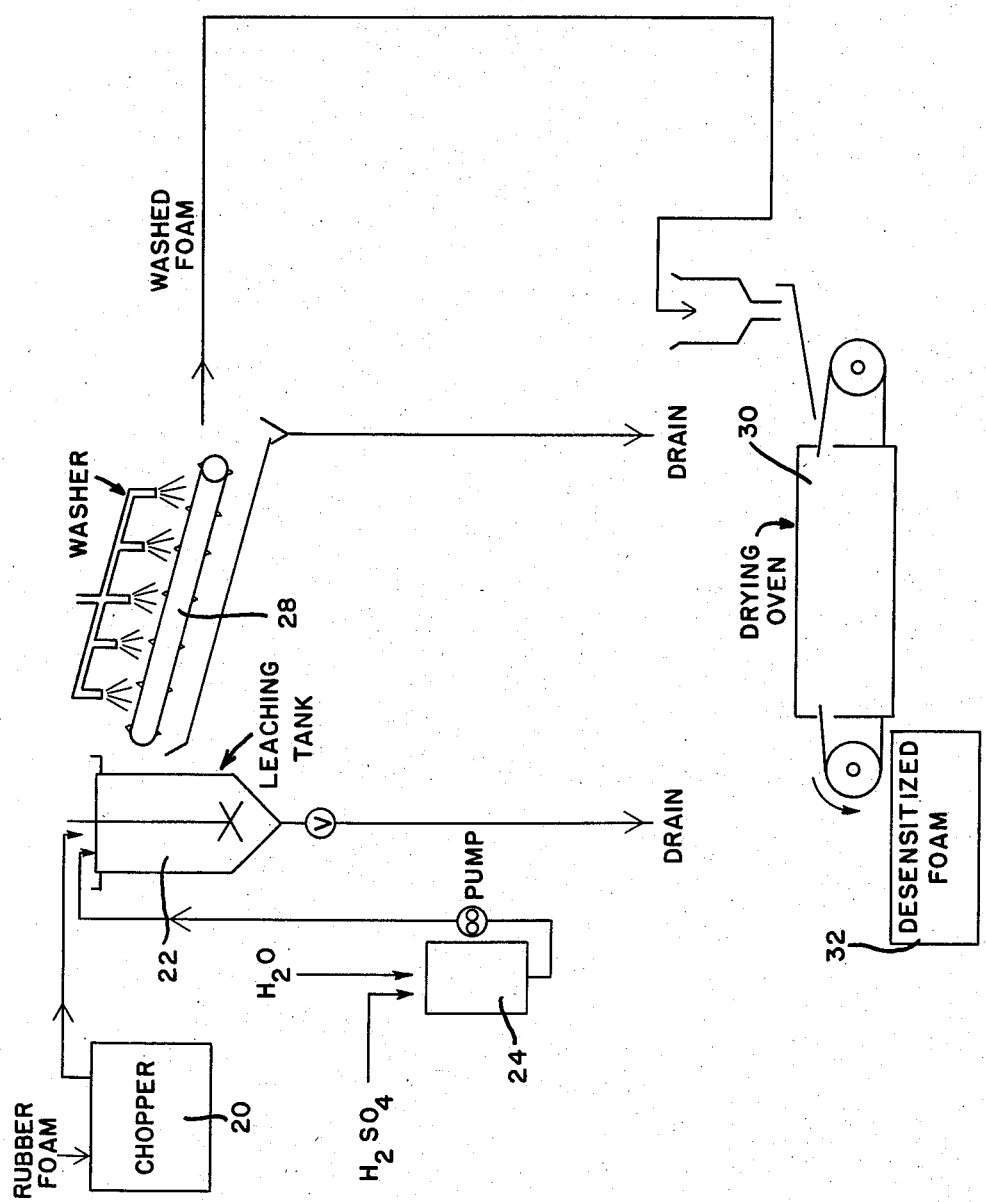

William L. Pearson and Harold E. Schweller, Dayton, Ohio, assignors to General Motors Corporation, Detroit, Mich., a corporation of Delaware Application November 25, 1957, Serial No. 698,489

8 Claims. (Cl. 260—2.3)

This invention relates to the reclaiming of uncured and compounded foam latex stock and is particularly concerned with a method for eliminating the accelerator system in such stock.

It is, therefore, the main object of the invention to provide a method for eliminating the accelerator system in wet, uncured, and compounded rubber-like stock by physically and chemically acting upon the stock for converting the accelerator system therein to soluble ingredients whereby said ingredients may be eliminated from the stock and the stock may be subsequently reused. More specifically, the invention is directed to operations on uncured and compounded foamed latex stock including a dithiocarbamate accelerator alone or in combination with a salt type of accelerator such as zinc, sodium, cadmium, calcium mercaptobenzothiazole, etc.

In carrying out the above objects, it is a further object to provide a method for eliminating the accelerator system in wet, compounded foam wherein the stock is comminuted, acidified for converting the accelerator material to soluble and heat decomposable compounds, leached and then dried whereby the stock may be reused alone or as a portion of the rubber-like ingredient in a rubber-like compound.

Further objects and advantages of the present invention will be apparent from the following description, reference being had to the accompanying drawings wherein preferred embodiments of the present invention are clearly shown.

In the drawing, the figure shows diagrammatically a flow sheet of the process disclosed herein.

In the manufacture of molded latex foam products, there is a considerable loss of the rubber-like material from the flash which is formed during the molding operation. This flash, while in relatively small amounts per mold, accumulates into huge quantities where the production operation is carried out on a large scale and the loss of said scrap presents a serious economic problem. In fact, in the manufacture of articles such as sealing strips wherein the cross section of the article is relatively small and the mold closure produces two points of flash formation, the amount of flash at times reaches 15% by weight of the uncured foam stock used. This flash cannot be finely ground until it is dried since the gelled foam stock contains in the order of 40% water. Therefore, it is necessary to dry the stock prior to grinding for reuse in rubber-like formulations which drying operation causes the compound to cure due to the presence of sulfur and an accelerator system contained therein. Thus, the reclaimed flash material has heretofore only been useful as a filler which material sells at a very low price and which, therefore, represents appreciable loss of profit in molding operations involving rubber foams.

The present invention is specifically directed to a method whereby this flash or other scrap in the uncured and wet state can be treated to substantially eliminate the accelerator system whereby the treated material can be dried and added to solid rubber-like compositions in prescribed amounts wherein the added stock is subsequently curable and no longer acts merely as a filler but as a portion of the rubber-like compound.

This flash material may be any compounded rubber-like material which includes sulfur and dithiocarbamate type accelerators wherein the rubber-like material is either natural rubber, butadiene styrene copolymer rubber (GRS), butadiene acrylonitrile copolymer rubber (GRN), etc., and any compatible combinations thereof. Therefore, when the term "rubber-like" is used herein, it refers to any one or combination of the well known material that, when compounded and heated, will cure into elastomeric masses, having a shape determined by the molds used.

Specifically, foam rubber-like strips may be made from formulations set forth hereinafter wherein all parts are parts by weight on a dry basis:

*Example 1*

| | Parts |
|---|---|
| Natural rubber latex | 70 |
| GRS latex | 30 |
| Zenite Special (zinc mercaptobenzothiazole) | 1.5 |
| Ethyl Zimate (zinc diethyldithiocarbamate) | .75 |
| Fatty acid soap (potassium oleate) | 1.0 |
| Sulfur | 2.5 |
| Agerite White (symmetrical dibeta naphthylparaphenylene diamine) | 1.5 |
| Trimene base (reaction product of NH$_3$ and ethylene dichloride) | 1.0 |
| Mineral oil | 3.0 |
| Carbon black | 1.0 |
| Zinc oxide | 4.2 |
| Sodium silicofluoride | 2.2 |

*Example 2*

| | Parts |
|---|---|
| Natural rubber latex | 100 |
| Zinc dibutyl dithiocarbamate | 1.5 |
| Fatty acid soap (sodium oleate) | .75 |
| Agerite White (symmetrical dibeta naphthylparaphenylene diamine) | 1.5 |
| Sulfur | 3 |
| Mineral oil (light process) | 4 |
| Carbon black | 40 |
| Zinc oxide | 3 |

*Example 3*

| | Parts |
|---|---|
| GRS latex | 50 |
| GRN latex | 50 |
| Mixed dithiocarbamates (zinc dibutyl-zinc diethyl) | 2 |
| Fatty acid soap (sodium oleate) | .75 |
| Agerite White (symmetrical dibeta naphthylparaphenylene diamine) | 1.5 |
| Sulfur | 3 |
| Mineral oil (light process) | 4 |
| Carbon black | 25 |
| Zinc oxide | 3 |

*Example 4*

| | Parts |
|---|---|
| GRN latex | 35 |
| Natural rubber latex | 65 |
| Zenite Special (zinc mercaptobenzothiazole) | 1.5 |
| Ethyl Zimate (zinc diethyldithiocarbamate) | .75 |
| Fatty acid soap (potassium oleate) | 1.0 |
| Sulfur | 2.5 |
| Agerite White (symmetrical dibeta naphthylparaphenylene diamine) | 1.5 |
| Trimene base (reaction product of NH$_3$ and ethylene dichloride) | 1.0 |
| Mineral oil | 3.0 |
| Carbon black | 1.0 |
| Zinc oxide | 4.2 |
| Sodium silicofluoride | 2.2 |

Example 5

| | Parts |
|---|---|
| GRS latex | 100 |
| Zenite Special (zinc mercaptobenzothiazole) | 1.0 |
| Ethyl Zimate (zinc diethyldithiocarbamate) | 1.25 |
| Fatty acid soap (sodium oleate) | .75 |
| Agerite White (symmetrical dibeta naphthylparaphenylene diamine) | 1.5 |
| Sulfur | 3 |
| Mineral oil (light process) | 4 |
| Zinc oxide | 3 |

In the above compositions, the sulfur and zinc oxide are vulcanizing agents, the sodium silicofluoride is a gelling agent, Agerite White is an antioxidant, the fatty acid soap is a gel stabilizer and the trimene base, zenite special and ethyl zimate form the ultra-accelerator system for curing the compositions.

In the above recipes, the rubber component, sulfur and the accelerator system are the essential ingredients, the remaining components are used to obtain vulcanization control and desired physical characteristics in the foam and may vary widely. Also, other well known materials may be substituted or added as desired. For example, the pigment, such as carbon black, may vary from 0 to 80 parts by weight per 100 parts of rubbery polymer according to the tensile value required. In general, when the polymer content (latex) weight is held at 100 parts, it is desirable to keep the accelerator and sulfur within ±40% of the figures noted in Example 1. However, all other ingredients may vary widely without affecting the present invention which is directed specifically to the elimination of the accelerator system.

In the manufacture of foam rubber-like products, for example, a foam strip from the composition noted in Example 1, the latices in about a 60% solid solution of water are beaten or whipped into a foam. During the course of this beating operation, the various compounding ingredients are added at intervals preferably in water solution wherein the final foam is maintained at about 60% solids. This flowable foam is fed into a mold and will subsequently gel therein to form a self-sustaining article. When the mold is closed, portions of the foam will ooze out along the mating edges of the mold and this material is termed flash. After the molded material has gelled, the upper portion of the mold is removed with the flash superficially adhered thereto and the lower portion of the mold with the gelled material therein is passed through a curing oven or chamber for vulcanizing or curing the material. The flash, however, has not been cured and it is the reclaiming of this flash that forms the subject matter of this invention.

Specifically, the flash is processed as shown diagrammatically on the flow chart, Figure 1, wherein the wet, uncured flash is placed in a chopper 20 and is comminuted into particulate form. The degree of comminution is a matter of choice and the larger the foam particles, the longer the time required for the leaching operation. We prefer that the chopped foam be sufficiently small to pass through a ¼ inch mesh screen. Thereafter, the chopped foam passes into a leaching chamber 22 where acid from a tank 24 is added. Any mineral acid that is not strongly oxidizing may be used. For example, hydrochloric, phosphoric or sulfuric acids are all satisfactory. For purposes of this example, we will use sulfuric acid. The acid is used in a 10% solution of commercial grade sulfuric acid in water and this acid, together with the particulate foam, is agitated in the leaching chamber 22 for a period of about four hours. The concentration of acid may vary between 3–15% and, in this case, the period of leaching will have to be adjusted to obtain the desired results. During this leaching operation, the sulfuric acid is believed to react with the zinc mercaptobenzothiazole to form mercaptobenzothiazole and zinc sulfate and is also believed to react with the zinc diethyl dithiocarbamate to form dithiocarbamic acid and zinc sulfate. The dithiocarbamic acid is a decomposable compound which forms carbon disulfide gas and water soluble diethyl amine. The mercaptobenzothiazole remains and zinc sulfate is water soluble. Thus, this leaching operation eliminates the accelerator system since the material in the leaching tank is drained and the particulate material is placed on a conveyor 28 which is sprayed with water to eliminate the remaining traces of the water soluble ingredients and acid. Thereafter, the particulate material is carried by conveyors to a drying oven 30 where it is heated to a temperature of 150–180° F. and dried at which time the volatile materials are eliminated. The trimene base is removed in the washing step since it is a water soluble material. During this entire operation, portions of the zinc oxide are converted to soluble zinc sulfate and are also removed. The material, after passing through the drying oven is stored in a bin 32 for subsequent use in compounding of rubber. This dried material may subsequently be used as an additive to a rubber compound using virgin rubber stock or it may be used as the entire rubbery ingredient in specific stocks if the recipes are properly adjusted to give the desired physical properties.

When the desensitized foam is used as an additive, it is preferably used in quantities of from 5% to 10% of the rubbery ingredient in a solid rubber-like formulation. This desensitized particulate stock will vulcanize with the remainder of the material during the curing step due to the addition of accelerators during the compounding thereof. Some representative formulations using the desensitized stock as an additive are as follows:

Example 6

| | Parts |
|---|---|
| Rubber ingredient (crude natural rubber, 38 parts—desensitized foam, 4 parts) | 42.00 |
| Accelerator (benzothiazyldisulfide) | .50 |
| Carbon black | 25.20 |
| Clay | 25.20 |
| Zinc oxide | 3.50 |
| Sulfur | .80 |
| Stearic acid | 1.00 |
| Paraffin | 1.00 |
| Antioxidant (phenolbetanaphthylamine) | 20.00 |

Example 7

| | Parts |
|---|---|
| Rubber ingredient (GRS copolymer rubber, 54 parts—desensitized foam, 5 parts) | 59.00 |
| Accelerator (mercaptobenzothiazole) | .90 |
| Zinc oxide | .30 |
| Antioxidant (hydroquinonemonobenzoether) | 1.40 |
| Carbon black | 29.00 |
| Coal tar | 6.50 |
| Sulfur | 1.20 |

In either of the above formulations, butadiene acrylonitrile copolymer rubber may be substituted in whole or in part for the crude natural rubber or the GRS rubber. In both formulations, all parts are parts by dry weight. The materials made from these formulations may be molded and then cured in open steam for from 25 to 30 minutes at pressures ranging from 50 to 70 p.s.i. The vulcanized molded articles are useful for many purposes such as motor mounts, gaskets, etc.

When the particulate desensitized foam is to be used as the entire rubber ingredient in a compound, it may be compounded as usual but without sulfur being added since the sulfur is already present. However, we have found that, for the most part, the physical properties may be enhanced by addition of carbon black and that satisfactory vulcanization can be accomplished by merely adding zinc oxide to the formulation. Thus, with a desensitized foam derived from the recipe noted in Example 1, a satisfactory formulation may be made by using 114 parts of this desensitized material with 3 parts of zinc oxide and with carbon black ranging from 0 to 80 parts with 40 parts being preferred. This material can be cured after molding (20 to 30 minutes in steam at about 298° F.) and will be found to have satisfactory physical characteristics. For example, when cured for 20 minutes and using 40 parts by weight of carbon black, 114 parts of the desensitized foam and 3 parts of zinc oxide, a product having a tensile strength of 2500 p.s.i. was obtained. When the carbon black was raised to 80 parts with the other ingredients remaining constant and cured for the same time under the same conditions, the tensile strength was 2120 p.s.i. whereas when no carbon black was added and the desensitized foam was merely accelerated with 3 parts of zinc oxide, the tensile fell to 1310 p.s.i. From these figures, it is apparent that by proper compounding and selection of reinforcing agents, etc., desired physical characteristics may be obtained when the desensitized foam is used as the entire rubbery ingredient in the compound.

Thus, we have provided a method whereby wet, compounded and gelled foam stock may be desensitized by the removal of the accelerator system therefrom and may thus be reused as an additive to conventional compounding operations or as the rubber ingredient in specific compounds.

While the embodiments of the present invention as herein disclosed constitute preferred forms, it is to be understood that other forms might be adopted.

What is claimed is as follows:

1. In a method for eliminating the accelerator system in wet, uncured and compounded foamed latex stock taken from the class consisting of natural rubber, butadiene styrene copolymer latex, butadiene acrylonitrile copolymer latex and compatible mixtures thereof, the steps comprising; comminuting wet, uncured latex foamed stock which includes sulfur and an accelerator system comprising water insoluble organic zinc salts, treating the comminuted stock with a 3% to 15% mineral acid solution taken from the class consisting of sulfuric acid, hydrochloric acid and phosphoric acid for a time sufficient to convert the organic zinc salts to zinc sulfate, soluble organic compounds and heat decomposable organic compounds, leaching the acid treated stock with water for removing the acid, the water soluble organic compounds and the zinc sulfate therefrom, and then drying the washed, comminuted stock and simultaneously decomposing the heat decomposable compounds therein for eliminating said compounds from the stock.

2. In a method for removing an ultra-accelerator system comprising zinc mercaptobenzothiazole and zinc diethyldithiocarbamate from uncured and compounded foamed latex stock taken from the class consisting of natural rubber, butadiene styrene copolymer latex, butadiene acrylonitrile copolymer latex and compatible mixtures thereof, the steps of; chopping the latex foam into comminuted form, treating the comminuted stock with a 3% to 15% sulfuric acid solution for a time sufficient to convert the ultra-accelerator system to zinc sulfate, mercaptobenzothiazole and thiocarbamic acid, washing the acid treated stock with water for dissolving out the zinc sulfate and mercaptobenzothiazole, and then drying the washed stock at a temperature sufficient to decompose the thiocarbamic acid whereby a dry, comminuted and desensitized stock is produced.

3. In a method for removing an accelerator system comprising zinc mercaptobenzothiazole and zinc dithiocarbamate from uncured and compounded foamed latex taken from the class consisting of natural rubber latex, butadiene styrene copolymer latex, butadiene acrylonitrile copolymer latex and compatible mixtures thereof, the steps comprising; chopping the latex foam into particulate form, leaching the particulate foam in a 10% solution by weight of sulfuric acid for a time sufficient to convert the accelerator system to zinc sulfate, mercaptobenzothiazole and thiocarbamic acid, washing the particulate foam free from acid and simultaneously dissolving out and removing the zinc sulfate and the mercaptobenzothiazole, and then drying the foam at a temperature of about 225° F. for a time sufficient to remove the free water therefrom and to decompose the thiocarbamic acid for removing the same whereby a dry, particulate and desensitized foam stock is produced.

4. The method as claimed in claim 1 wherein the mineral acid is sulfuric acid.

5. The method as claimed in claim 1 wherein the mineral acid is phosphoric acid.

6. The method as claimed in claim 1 wherein the mineral acid is hydrochloric acid.

7. In a method for desensitizing wet, uncured and compounded foamed latex stock wherein the latex is taken from the class consisting of natural rubber latex, butadiene styrene copolymer latex, butadiene acrylonitrile copolymer latex and compatible mixtures thereof and wherein the compounded stock includes a dithiocarbamate type of accelerator together with sulfur, the steps of; leaching the foam in particulate form in a 3% to 15% aqueous solution of a mineral acid taken from the class consisting of sulfuric acid, hydrochloric acid and phosphoric acid under conditions of time for converting the dithiocarbamate accelerator to a soluble salt and dithiocarbamate acid, washing the leached stock for removing the mineral acid and the soluble salt therefrom, and then drying the washed stock and eliminating the dithiocarbamic acid therefrom whereby the dried material comprises desensitized foamed latex stock.

8. In a method for desensitizing wet, uncured and compounded foamed latex stock wherein the latex is taken from the class consisting of natural rubber latex, butadiene styrene copolymer latex, butadiene acrylonitrile copolymer latex and compatible mixtures thereof and wherein the compounded stock includes zinc dithiocarbamate together with sulfur, the steps comprising; leaching the foam in particulate form in a 3% to 15% water solution of sulfuric acid for a time sufficient to convert the zinc dithiocarbamate to zinc sulfate and dithiocarbamic acid, washing the leached stock to remove the sulfuric acid and the zinc sulfate therefrom, and then drying the leached and washed stock at a temperature of about 225° F. for removing water and dithiocarbamic acid therefrom.

No references cited.